UNITED STATES PATENT OFFICE.

MAXIMILIAN TOCH, OF NEW YORK, N. Y., ASSIGNOR OF ONE-HALF TO HENRY M. TOCH, OF NEW YORK, N. Y.

PROCESS OF MAKING WATERPROOF PORTLAND CEMENT AND PRODUCT.

976,520. Specification of Letters Patent. Patented Nov. 22, 1910.

No Drawing. Application filed April 1, 1910. Serial No. 552,876.

*To all whom it may concern:*

Be it known that I, MAXIMILIAN TOCH, a citizen of the United States, residing at New York, in the county of New York and State of New York, have invented certain new and useful Improvements in Processes of Making Waterproof Portland Cement and Product, of which the following is a specification.

According to the present invention, Portland cement is rendered waterproof by incorporating with it, either during its manufacture or in its commercial form, a glycerid of a fatty acid and a metallic oxid or compound capable of combining with glycerin. The glycerid is thereupon saponified by lime in the cement mixture, with the production of a water-insoluble fatty-acid salt or salts of calcium, and glycerin, and the glycerin is then combined with the metallic base to form an insoluble glycerid of the metal.

In carrying out the invention, the glycerid, e. g., stearin, or mutton or beef tallow, and the metallic compound, e. g., litharge, are either added to and ground with the cement clinker or are intimately mixed with commercial Portland cement. The mixture is preferably heated and the lime in the mixture reacts with the stearin or other fat with the production of calcium stearate or other fatty-acid salt or salts, while the freed glycerin combines with the litharge to form lead glycerid, insoluble in salt water. It is sufficient to add the fat in such amount as to produce from one to two per cent. of the calcium fatty-acid compound in the finished product, the amount of litharge simultaneously added being calculated on the basis of the glycerin contained in the fat.

Instead of effecting the saponification of the added fat by the calcium compounds present in the cement, quicklime may be added to the clinker or cement in amount sufficient to partially or wholly satisfy the fatty acids. A small amount of naphthalene, e. g., three per cent., may also be added to the cement to increase its water-shedding properties.

I am aware that it is old to waterproof Portland cement by adding thereto preformed stearate of lime free from glycerin, this being the subject-matter of U. S. Letters Patent No. 851,247, granted April 23, 1907, to Spencer B. Newberry. The present invention is distinct from the Newberry process, however, in that fats and not free fatty-acids are employed, and in that both components of the fat are utilized, upon its saponification, to produce waterproofing compounds.

I claim:

1. The process of making waterproof Portland cement, which consists in mixing with the cement a fat and a metallic compound the base of which will combine with glycerin, saponifying the fat by a calcium compound in the mixture, and binding the liberated glycerin as a metallic glycerid.

2. The process of making waterproof Portland cement, which consists in mixing with the cement a fat and lead oxid, reacting on the fat with production of a calcium fatty-acid salt and glycerin, and binding the glycerin as lead glycerid.

3. The process of making waterproof Portland cement, which consists in mixing with the cement a fat, lead oxid and naphthalene, reacting on the fat with production of a calcium fatty-acid salt and glycerin, and binding the glycerin as lead glycerid.

4. Water-proof Portland cement having admixed therewith a calcium fatty-acid salt and a metallic glycerid.

5. Water-proof Portland cement having admixed therewith a calcium fatty-acid salt and lead glycerid.

6. Water-proof Portland cement having admixed therewith a calcium fatty-acid salt, lead glycerid and naphthalene.

In testimony whereof, I affix my signature in presence of two witnesses.

MAXIMILIAN TOCH.

Witnesses:
ARCHIBALD C. REID,
ROBT. M. WHITESELL.